United States Patent [19]

Scholes et al.

[11] 3,919,391
[45] Nov. 11, 1975

[54] ELECTROSTATIC SCRUBBER-PRECIPITATOR

[75] Inventors: Addison B. Scholes; Bruce F. Semans, both of Muncie, Ind.

[73] Assignee: Ball Corporation, Muncie, Ind.

[22] Filed: Oct. 9, 1973

[21] Appl. No.: 404,450

[52] U.S. Cl. .......................... 423/240; 55/8; 55/10; 55/71; 55/72; 55/95; 55/118; 55/122; 55/152; 55/223; 423/215.5
[51] Int. Cl.² ........................................ B01D 53/34
[58] Field of Search .......... 55/8, 10, 71, 72, 94, 95, 55/118, 122, 151, 152, 223; 423/210, 210.5, 240, 241

[56] References Cited
UNITED STATES PATENTS

| | | | |
|---|---|---|---|
| 1,130,212 | 3/1915 | Steere | 55/152 |
| 1,828,646 | 10/1931 | Dantsizen | 55/10 |
| 1,905,993 | 4/1933 | Buff | 55/118 |
| 2,814,360 | 11/1957 | Beaver | 55/122 |
| 3,789,109 | 1/1974 | Lyon et al | 55/122 |

*Primary Examiner*—Bernard Nozick
*Attorney, Agent, or Firm*—Gilbert E. Alberding

[57] ABSTRACT

The subject invention relates to a method for removing hot exhaust treatment gases containing tin or titanium compounds associated with glass making operations. The apparatus and method herein described comprises exhausting the treatment gases through a plurality of directed fluid treating patterns whereby the hydroscopic materials are hydrated forming aggregates and the suspended particles are wetted, passing the exhausted gases over a supply of a treating fluid whereby some of the aggregates and wetted particles are removed, exposing thereafter the exhausted gases to ions in an electrostatic field so that the remaining aggregates and wetted particles are charged and travel under the influence of the field, and removing the charged aggregates and particles by a descending fluid film.

2 Claims, 3 Drawing Figures

U.S. Patent    Nov. 11, 1975    Sheet 2 of 2    3,919,391
OUTLET
INTAKE
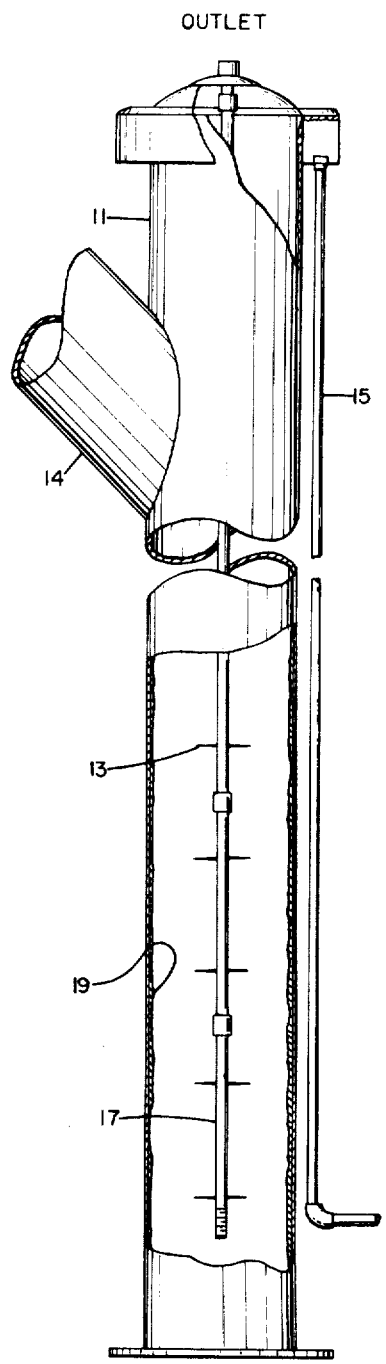
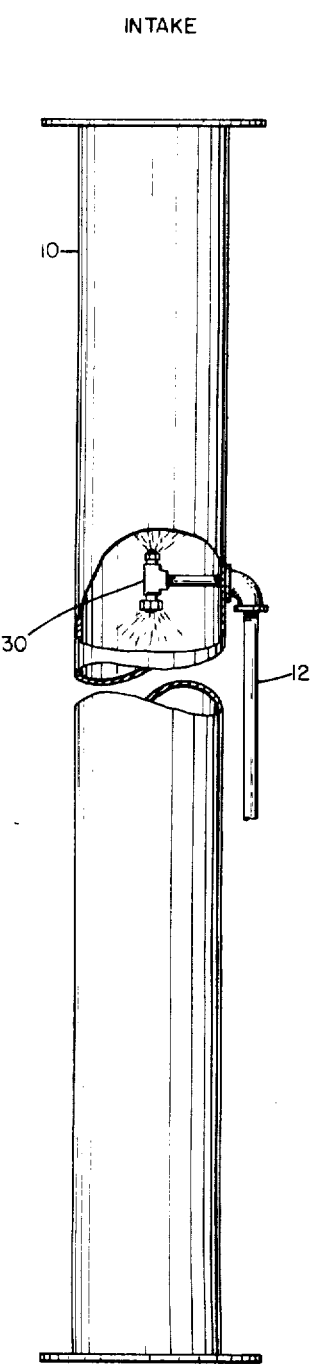
FIG 2
FIG 3

ELECTROSTATIC SCRUBBER-PRECIPITATOR

BACKGROUND OF THE INVENTION

The present invention relates to a method for scrubbing discharges from industrial furnaces and the like, especially glass treating equipment.

As is well known, scrubbing means of many descriptions have been employed for cleansing gaseous materials of particulate matter prior to being emitted to the atmosphere. It is generally found that scrubbing alone is not fully satisfactory in lowering the amount of particles released to the atmosphere and, hence, to merely set up a scrubbing system often may not be effective, absent the knowledge of the particular problems to be solved and a discovery of an effective operation in view of the problems to be overcome.

Often in scrubbing systems hot gaseous material is brought into sufficiently intimate contact with a fluid, so that the undesirable components of the gases are absorbed or precipitated out of the exhaust flow. Usually, the removal of these materials requires the mechanism of impingement, condensation and diffusion. Generally, the components or dispersoids to be removed are organic as well as inorganic substances and many of these materials may be readily removed by using the scrubbing fluids or a series of filters or a combination of scrubbing towers and filters. Generally, when scrubbing fluids are employed, there is a need for large volumes as well as means for agitating the fluid in order to precipitate the solid particles from the gaseous flow.

As regards the glass industry and, in particular, the treatment of vitreous articles, a number of means have been employed to protect against degrading such articles in strength and other essential properties. In the treatment of such articles and prior to annealing, they are exposed to vaporous materials with an inert carrier gas whereby an even and protective film is placed upon the vitreous surfaces. These films or coatings are generally oxides and are intimately associated with the glass surface.

It will be appreciated that there is a substantial amount of vapor material which is either recycled or vented to the atmosphere which would present air pollution problems in the vicinity of such equipment. Also, since many of these compounds are halogen-containing materials, they are often corrosive or combine with other materials to render acidic conditions which are detrimental to operating machinery. Also, the venting means such as fans and other air-moving equipment when exposed to these corrosive materials often are internally corroded so that they are rendered useless after a short period of time.

The instant method employing the invention herein is an improvement to the general category of known methods with novel features being provided.

SUMMARY OF THE INVENTION

Briefly, in accordance with the invention a method is shown of removing hot exhaust treatment gases containing suspended particles. Generally, the method comprises the steps of exhausting the treatment gases downwardly against and through a plurality of directed fluid treating patterns whereby the hydroscopic materials are hydrated, passing the gases over a pool of a treating fluid, and thereafter exposing the gases to ions in an electrostatic field so that the wetted particles, hydrates and aggregates thereof are charged and removed by the influence of the field. The field itself is associated with collecting liquid in the form of a thin film proximate an electrode so that the charged sustances are impinged on the liquid film and washed therefrom.

The present invention contemplates a method for removing hot exhaust treatment gases. The apparatus comprises means for exhausting and wetting the treatment gases, means associated with said exhausting means for collecting at least some of the materials exhausted therethrough, means for imparting to the remaining treated materials an electrostatic charge, an advancing collecting surface proximate said imparting means for removing the charged particles, and means associated with the means for imparting the electrostatic charge for condensing a substantial portion of the resulting exhausted gases.

The materials to which the subject invention is mainly addressed include the titanium and tin compounds. It has been known that compounds of these metals, and especially the halides thereof are particularly useful in treating vitreous surfaces. Thus, the compound used to treat such surfaces may be an inorganic salt such as tin tetrachloride, titanium tetrachloride or an organic compound such as alkylaryl tin or isopropyl titanate. Tin compounds such as stannous chloride, stannic chloride, stannous floride, diethylisobutal tin, di-isopropyl tin dibromide, and the like have been employed in forming tin oxide coatings on glass articles. Further, titanium compounds such as titanium tetrachloride or tetraisopropyl titanate likewise have been found to be industrially important in forming a titanium dioxide coating on glass articles. Although they are effective to produce enhanced properties, they present special handling problems. These compounds in the halide form readily undergo hydrolysis to form the hydrogen halides and include hydrochloric acid and hydrofluoric acid. As is well known these gases are most corrosive and require special handling conditions, particular design in equipment and the employment of special non-corrosive metals.

Aside from the fact that these compounds foul the atmosphere and give rise to corrosive gases, the materials being hydroscopic tend to swell and enlarge the particle size. The employment of filters and special venting means when utilized in an attempt to control this hazardous situation are rendered thoroughly coated and caked with, or simply corroded away by such materials and therefore are rendered useless. In short, because of the nature of the materials being handled, maintenance cost and the special design required are often found prohibitive.

BRIEF DESCRIPTION OF THE DRAWINGS

The features of specific embodiments of the best mode contemplated of carrying out the invention are illustrated in the drawings, in which:

FIG. 2 shows the electrostatic portion of the invention in more detail and includes the electrode and collecting surface employed to remove particulate matter passing therethrough;

FIG. 3 is a side elevation view in section of a scrubbing column incorporating the principles of the invention.

DETAILED DESCRIPTION OF THE DRAWINGS

Figure 1:
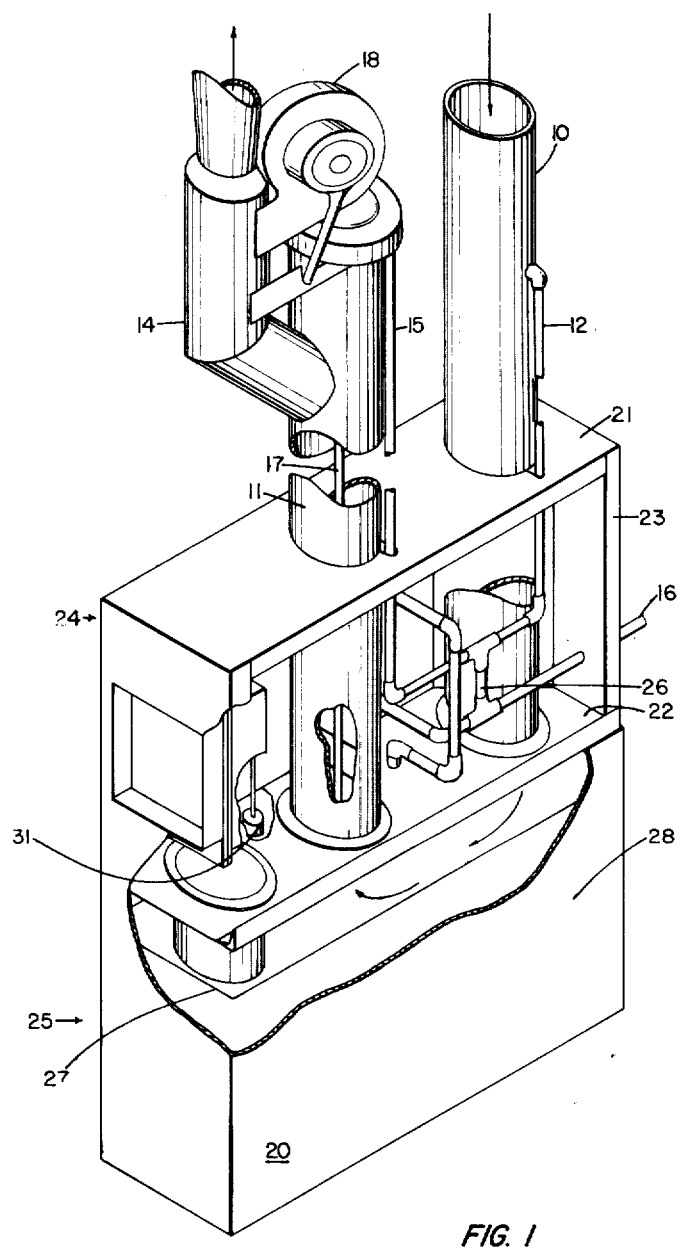
FIG. 1 is a view of the electrostatic device having cutaway portions showing the interior thereof.

In turning to the figures where like numbers refer to like figures, FIG. 1 is a prospective view of the apparatus of this invention having portions of the apparatus cutaway to show selected interior components. In FIG. 1 a principal unit embodying the essential features of the subject invention is shown. The device comprises a major housing 20 which may be divided into two sections, an upper section 24 and a lower section 25. The lower section 25 is a rectangular body used to confine a collecting fluid 27 employed in the apparatus. The upper section 24 is provided with two lengths of cylindrical columns 10 and 11 which are supported and attached to a table plate 21 and a supporting table 22. Provided within housing 20 is outlet tubing 16 which is supported by an upright wall 23 and is fitted via of a tee-shaped tube 26 to the upper portions of column 10 on the one side and column 11 on the other by tubing 12 and 15, respectively. At the terminal portion of tubing 12 there is provided within the internal surface of column 10 a flare nozzle 30. Although only one pair of nozzles are shown, it is understood that several may be used. As regards cylindrical column 11 there is provided centrally an electrode 17 having a plurality of pointed members 13 attached to and spaced apart from electrode 17. The electrode 17 is placed well above the level of fluid in reservoir 28. Column 11 is provided with a suction fan 18 which communicates with and is attached to an angled extension of column 11, an exhaust stack 14.

Although forming no part of this invention means are associated with the subject device for maintaining a constant fluid level within the reservoir. A number of such means are conventional and well known to those skilled in the art. A regular valve and float assembly 31 has been successfully employed with the subject device.

In operation, hot gaseous materials which may be generally anywhere between a temperature of about 100 to about 600°F., is drawn into cylindrical member 10 by means of the suction fan 18. The hot gaseous material is impinged by a basic fluid, i.e., a fluid having pH greater than 7, issuing from nozzle 30. It is advantageous that the hot gases drawn into member 10 be adequately cooled below about 160°F. In cylindrical member 10, the gaseous material is not only cooled but the volume being drawn becomes saturated with water vapors. Thus, the gaseous material is conditioned in that it is cooled and humidified. It follows that the organic and inorganic halides within the gaseous material are hydrolyzed producing products which are solids. It will also be appreciated that any hydrochloric acid will be taken up by the saturated water atmosphere within member 10. Essentially, the gaseous material comprising the organic and inorganic halides undergoes a phase change from that of a gaseous state to that of a solid state. During the cooling process the gases are drawn downwardly through the full extend of member 10 into the upper portion of section 25. Although the organic and inorganic materials are at once hydrated and hydrolyzed in the scrubbing operation resulting in the formation of solid particles there is also agglomeration of these particles. These particles and agglomerates thereof are generally larger than 1 micron and are mostly entrained and captured in the sweep of droplets containing the particles. Larger heavy particles which have not been entrained fall by gravity into the collecting fluid 27 forming a reservoir 28. The remaining gases are drawn across reservoir 28 and upwardly into the column 11 where they are at once subjected to the influence of an electrostatic field created by electrode 17 and column 11. The particles are at once charged and drawn to the walls of column 11 where they are swept by a collecting fluid 19 which presents a thin film circumferentially within column 11. Thus, charged particles are drawn and washed downwardly into the reservoir 28 and are precipitated therein. It will be appreciated that column 11 also functions as a condensation column in that the saturated water vapor in passing upwardly through colmnn 11 becomes supersaturated. Thus, the column 11 functions as a condensation tower in that the highly humidified stream of vapors reaches it dew point and there occurs a raining affect within column 11. The formation of this rain or fine droplets within the column 11 is advantageous in that it removes acidic materials therefrom.

It has been found that generally about 40% of the acidic materials is removed by the scrubbing operation which occur in cylindrical column 10 and thereafter about 50% of the remaining acidic material is removed by the condensation of the highly humidified stream in column 11. It should be recalled that acidic gases which are produced in the apparatus and which are captured and drawn thereto pass through column 11 and are absorbed into the fluid whereby the acidic materials are neutralized by basic ingredients dissolved therein. Accordingly, it has been found that the apparatus described herein is capable of removing about 90% of all the acidic fumes which are channeled therethrough.

Although the exact dimensions of the device are not critical and will depend upon sundry parameters it has been found advantageous for most industrial applications that the columns 10 and 11 be about 10 feet in length and about 8 inches in diameter. Generally, the first column 10 is provided with a bank of spray nozzles which continuously flush and scrub the downwardly drawn treatment gases. It has been found that approximately 600 gallons per hour of aqueous solution made basic with dissolved ingredients such as sodium carbonate, sodium bicarbonate, sodium hydroxide and the like, will serve several hot-end glass forming machines. Generally, it has been found advantageous when the pH of the solution is approximately 8 or higher whereby proper naturalization of acidic material can be accomplished.

The term hydration as used herein denotes the reaction or the accomodation of a substance with a discrete amount of water.

The described embodiment of the subject invention is only considered to be preferred and illustrative of the inventive concept; the scope of the invention is not to be restricted to this embodiment. Various and numerous other arrangements may be devised by one skilled in the art without departing from the spirit and scope of this invention.

We claim:

1. A method of removing from hot exhaust treatment gases hydroscopic materials including tin and titanium compounds and suspended particles, comprising: impinging the treatment gases with a spray of directed basic liquid, the treatment gases being between about 100° F. and 600° F., whereby the hydroscopic materials are hydrated forming aggregates ranging in size from about 1.5 to about 3.5 microns in average particle size and the suspended particles are wetted, cooling the treatment gases to a temperature below about 158° F., passing the gases proximate a reservoir of the basic liquid whereby some of the aggregates and wetted particles are entrapped in the reservoir, maintaining a saturated water vapor environment above said reservoir, exposing the impinged gases thereafter to ions in an electrostatic field so that the remaining aggregates and wetted particles are charged and travel under the influence of the field, and collecting the charged aggregates and particles by a thin descending liquid film.

2. A method as recited in accordance with claim 1 wherein the hydroscopic materials include compounds selected from the group consisting of titanium and tin chlorides.

* * * * *